(12) United States Patent
Kim

(10) Patent No.: US 7,901,809 B2
(45) Date of Patent: Mar. 8, 2011

(54) CAN-TYPE SECONDARY BATTERY HAVING A CAP ASSEMBLY FOR REDUCING EXCESSIVE HEATING

(75) Inventor: Chang Seob Kim, Chungcheongnam-do (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1201 days.

(21) Appl. No.: 11/194,057

(22) Filed: Jul. 28, 2005

(65) Prior Publication Data

US 2006/0051667 A1 Mar. 9, 2006

(30) Foreign Application Priority Data

Jul. 30, 2004 (KR) .................. 10-2004-0060088

(51) Int. Cl.
*H01M 2/04* (2006.01)
*H01M 2/02* (2006.01)

(52) U.S. Cl. ......... 429/175; 429/186; 429/170; 429/185; 429/163

(58) Field of Classification Search .............. 429/61, 429/181, 161
See application file for complete search history.

(56) References Cited

U.S. PATENT DOCUMENTS

2003/0194609 A1 * 10/2003 Nam et al. ............. 429/181
2004/0126650 A1 * 7/2004 Kim .................... 429/61

FOREIGN PATENT DOCUMENTS

KR 2003-0045961 * 6/2003
KR 2003066243 * 8/2003

OTHER PUBLICATIONS

KIPO Machine translation of KR2003-0045961.*

* cited by examiner

*Primary Examiner* — Dah-Wei D Yuan
*Assistant Examiner* — Maria J Laios
(74) *Attorney, Agent, or Firm* — Christie, Parker & Hale, LLP

(57) ABSTRACT

A can-type secondary battery is adapted to induce a short circuit between metal within the secondary battery when the secondary battery deforms due to an external impact in order to reduce heat generation and improve the safety of the secondary battery.

12 Claims, 7 Drawing Sheets

CAN-TYPE SECONDARY BATTERY HAVING A CAP ASSEMBLY FOR REDUCING EXCESSIVE HEATING

CROSS REFERENCE TO RELATED APPLICATION

This application claims priority to and the benefit of Korea Patent Application No. 10-2004-0060088 filed on Jul. 30, 2004, in the Korean Intellectual Property Office, the entire content of which is incorporated herein by reference.

BACKGROUND OF THE INVENTION

1. Field of the Invention

The present invention relates to a can-type secondary battery, and more particularly to a can-type secondary battery adapted to induce a short circuit between metal within the secondary battery when the secondary battery deforms due to an external impact 2. Description of the Prior Art As portable wireless appliances including video cameras, portable telephones, and portable computers tend to have reduced weight while incorporating more functions, much research has been conducted on secondary batteries which are used as the driving source of the appliances. For example, secondary batteries include nickel cadmium batteries, nickel hydrogen batteries, nickel zinc batteries, and lithium secondary batteries. Lithium secondary batteries are widely used in the cutting-edge electronic appliance fields because they can be recharged, they can be manufactured in a compact size with large capacity, and they have high operating voltage and high energy density per unit weight.

FIG. 1 is an exploded perspective view showing a conventional can-type secondary battery.

The can-type secondary battery is formed by placing an electrode assembly 112 including first and second electrode plates 115, 113 and a separator 114 into a can 110 together with an electrolyte and sealing the top opening 110a of the can 110 with a cap assembly 120. The first and second electrode plates 115, 113 may be formed as negative and positive electrode plates, respectively.

The cap assembly 120 includes a cap plate 140, an insulation plate 150, a terminal plate 160, and an electrode terminal 130. After being coupled to a separate insulation case 170, the cap assembly 120 is coupled to the top opening 110a of the can 110 to seal it.

The cap plate 140 is a metal plate having a size and a shape corresponding to the top opening 110a of the can 110. The cap plate 140 has a first terminal through-hole 141 formed at the center thereof with a predetermined size, into which the electrode terminal 130 is insertable. When the electrode terminal 130 is inserted into the first terminal through-hole 141, a gasket tube 146 is coupled to the outer surface of the electrode terminal 130 and is inserted together for insulation between the electrode terminal 130 and the cap plate 140. The cap plate 140 has an electrolyte injection hole 142 formed on the other side thereof with a predetermined size. After the cap assembly 120 is assembled to the top opening 110a of the can 110, an electrolyte is injected through the electrolyte injection hole 142, which is then sealed by a plug 143.

The electrode terminal 130 is connected to the first electrode tab 117 of the first electrode plate 115 or to the second electrode tab 116 of the second electrode plate 113 acts as a negative terminal or positive terminal.

The insulation plate 150 is made up of an insulation material like the gasket and is coupled to the bottom surface of the cap plate 140. The insulation plate 150 has a second terminal through-hole 151 formed in a position corresponding to the first terminal through-hole 141 of the cap plate 140 so that the electrode terminal 130 can be inserted therein. The insulation plate 150 has a seating groove 152 formed on the bottom surface thereof with a size corresponding to that of the terminal plate 160 so that the terminal plate 160 may be seated thereon.

The terminal plate 160 is made up of Ni metal or an alloy thereof and is coupled to the bottom surface of the insulation plate 150. The terminal plate 160 has a third terminal through-hole 161 formed in a position corresponding to the first terminal through-hole 141 of the cap plate 140 so that the electrode terminal 130 may be inserted therein. The electrode terminal 130 is coupled to the terminal plate 160 via the first terminal through-hole 141 of the cap plate 140 while being insulated by the gasket tube 146. As such, the terminal plate 160 is electrically connected to the electrode terminal 130 while being electrically insulated from the cap plate 140.

In order to couple the electrode terminal 130 to the cap plate 140, the insulation plate 150, and the terminal plate 160, the electrode terminal 130 is rotated while applying a constant force and is inserted into the first terminal through-hole 141. After passing through the first terminal through-hole 141, the electrode terminal 130 successively passes through the second and third terminal through-holes 151, 161, which are formed on the insulation plate 150 coupled to the bottom surface of the cap plate 140 and on the terminal plate 160, respectively. The inner diameter of the second terminal through-hole 151 formed on the insulation plate 150 is equal to or slightly larger than the outer diameter of the inserted electrode terminal 130 so that the electrode terminal 130 may be press-fitted into the second terminal through-hole 151 while the outer surface of the electrode terminal 130 is fastened thereto.

When an internal or external short circuit occurs in the electrode assembly of the lithium ion secondary battery or when the battery is subjected to overcharging/over-discharging, the voltage of the battery may rise abruptly and the battery may fracture. In order to avoid a short circuit within the secondary battery, insulation tape may be attached to parts vulnerable to a short circuit, including the welded portions between the electrode tab and the ends of the first and second electrode plates of the electrode assembly. In addition, the secondary battery is electrically connected to safety devices including a positive temperature coefficient (PTC) thermistor, a thermal fuse, and a protective circuit, in order to interrupt current when the voltage or temperature of the battery rises abruptly and to prevent the battery from fracturing.

When the secondary battery deforms due to an impact or pressure, however, neither the protective circuit nor the protective device may be able to avoid a short circuit between the electrode plates. According to a longitudinal compression evaluation method, which is one of the methods for evaluating the safety of the can-type secondary battery, the short circuit between the electrode plates within the can-type secondary battery is a problem. In a longitudinal compression test, which is one of the items for evaluating the safety of the can-type secondary battery, a compression jig is used to compress both lateral surfaces of the can-type secondary battery in a direction perpendicular to the longitudinal direction of the can-type secondary battery. During the compression, the compression surfaces of the compression jig remain parallel to both lateral surfaces of the can-type secondary battery and the compression force is 13 kN. As the can-type secondary battery is compressed according to the longitudinal compression evaluation method, the first and second electrode plates are short-circuited and current flows abruptly from the second electrode plate to the first electrode plate. As a result, excessive heat is generated by the first and second electrode plates' own resistance. The excessive heating may cause the secondary battery to explode.

SUMMARY OF THE INVENTION

Accordingly, embodiments of the present invention provide a can-type secondary battery adapted to induce a short circuit between metal within the secondary battery when the secondary battery deforms due to an external impact or pressure, in order to reduce heat generation and improve the safety of the secondary battery.

A can-type secondary battery is provided including an electrode assembly having first and second electrode plates and a separator; a can for containing the electrode assembly and an electrolyte; and a cap assembly having a cap plate, an insulation plate, an electrode terminal, and a terminal plate and coupled to the top opening of the can to seal it, wherein at least one side of the insulation plate about a terminal through-hole, into which the electrode terminal is inserted, has a size corresponding to that of the terminal plate mounted on the bottom surface of the insulation plate so that the terminal plate contacts the inner surface of the can when the can deforms due to longitudinal compression. The first and second electrode plates may be formed as negative and positive electrode plates, respectively.

The insulation plate may have a side about the terminal through-hole formed with a size corresponding to that of the terminal plate and the other side extending with a predetermined width so that the first electrode tab of the first electrode plate is welded to the terminal plate coupled to the bottom surface of the insulation plate.

The insulation plate may have a bottom plate to which the terminal plate is coupled and a lateral wall protruding downward from each lateral end and lateral surface of the bottom plate and the lateral end wall and the lateral surface wall of the lateral wall may be absent from at least one side of the insulation plate about the terminal through-hole so that the side has a size corresponding to that of the terminal plate.

The lateral end wall removed from a side of the insulation plate may remain with a predetermined width.

The width of the lateral end wall remaining on a side of the insulation plate may be equal to or less than 50% of the width of the insulation plate.

The height of the lateral wall may be equal to or larger than the height of the terminal plate.

The insulation plate may have a welding groove formed on the lateral surface wall, which is formed on the lateral surface of the other side about the terminal through-hole, in a position corresponding to the position to which the first electrode tab of the terminal plate is welded.

BRIEF DESCRIPTION OF THE DRAWINGS

FIG. 4b is a lateral view of the insulation plate shown in FIG. 4a.

FIG. 5b is a lateral view of the insulation plate shown in FIG. 5a.

DETAILED DESCRIPTION

Figure 1:
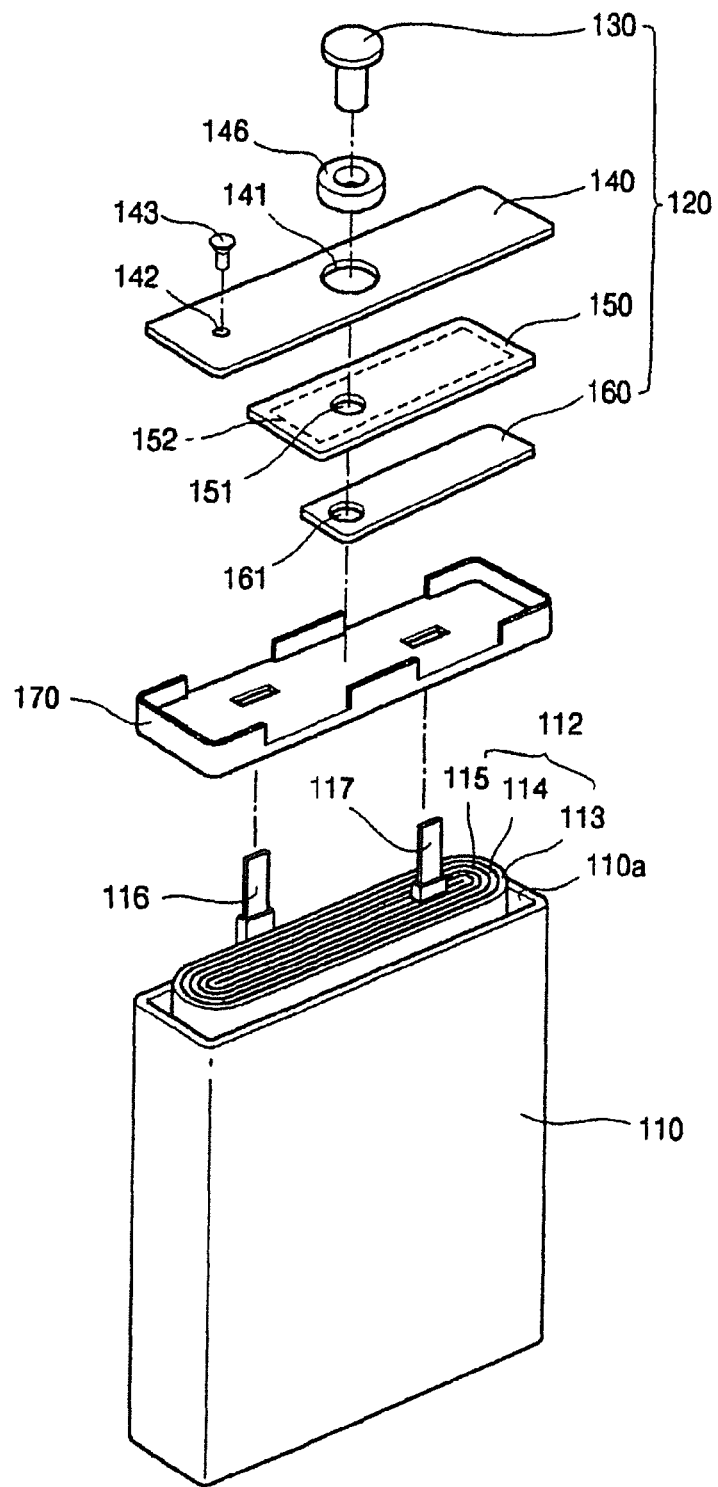
FIG. 1 is an exploded perspective view showing a conventional can-type secondary battery.
Figure 2:
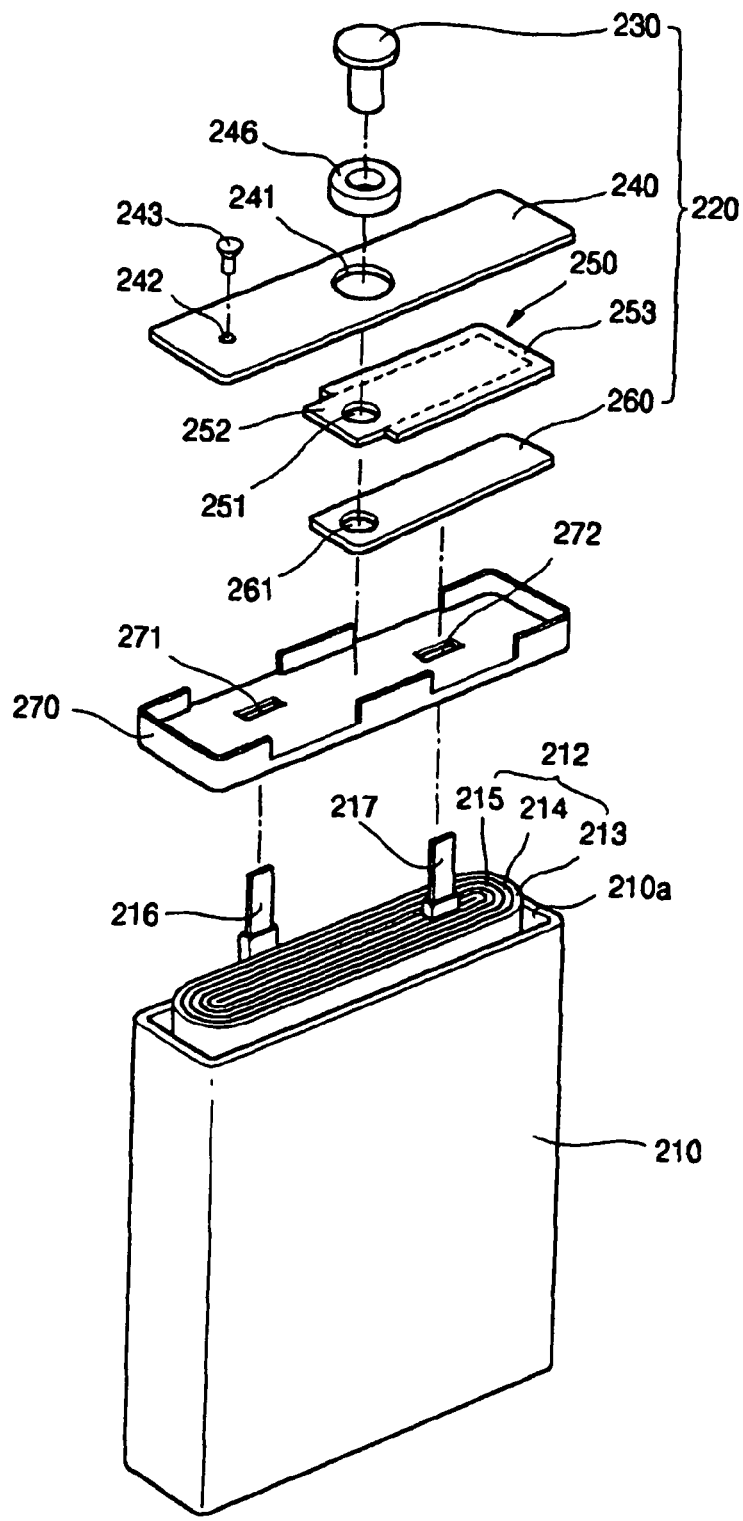
FIG. 2 is an exploded perspective view showing a can-type secondary battery according to an embodiment of the present invention.
Figure 3:
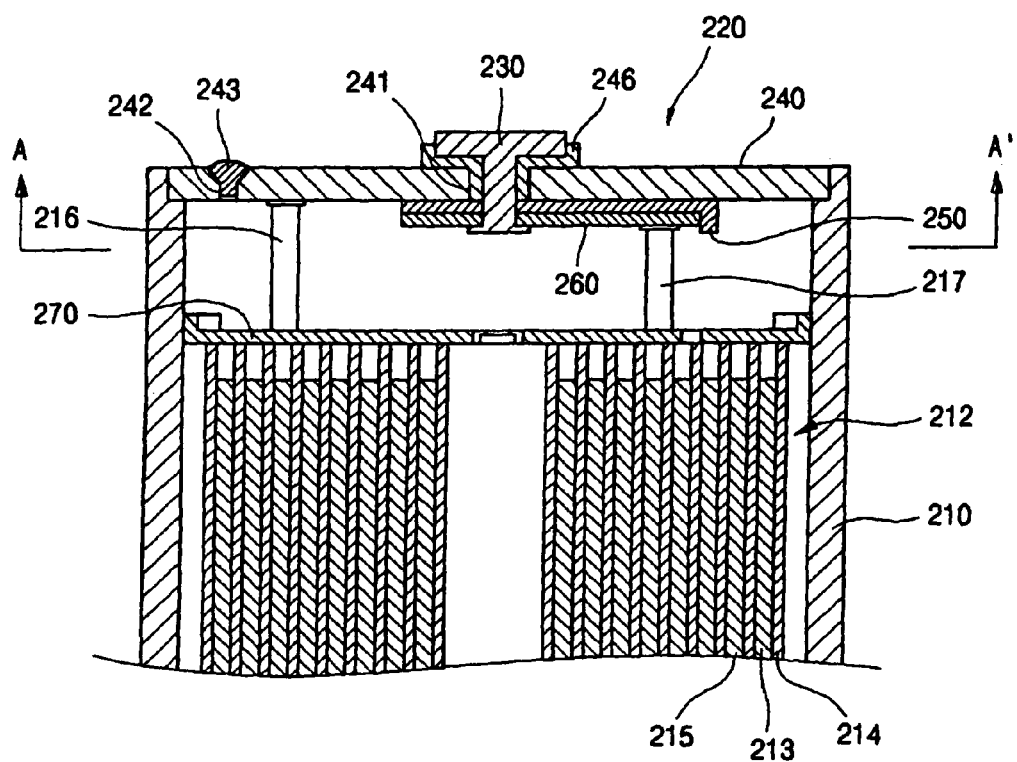
FIG. 3 is a partial sectional view showing a can-type secondary battery according to an embodiment of the present invention.

Referring to FIGS. 2 and 3, a can 210 includes an electrode assembly 212 contained in the can 210, and a cap assembly 220 for sealing the top opening 210a of the can 210. The cap assembly 220 is provided with an insulation plate 250 which causes the terminal plate 260 constituting the cap assembly 220 to be short-circuited when the secondary battery deforms due to an external force.

The can 210 is a metallic member having an approximately box shape and may be made from aluminum or an aluminum alloy which is light and ductile, but the material is not limited herein. The can 210 may have an opening formed on a surface thereof (e.g., a top opening 210a), through which the electrode assembly 212 is placed in the can 210.

The electrode assembly 212 includes first and second electrode plates 215, 213 and a separator 214. The first and second electrode plates 215, 213 are laminated with the separator 214 interposed between them and are wound into a jelly-roll configuration. The second electrode plate 213 has a second electrode tab 216 welded thereto, an end of which protrudes from the top of the electrode assembly 212. The first electrode plate 215 has a first electrode tab 217 welded thereto, an end of which protrudes from the top of the electrode assembly 212. The first and second electrode plates 215, 213 are generally formed as negative and positive electrode plates, respectively, but they may be switched if necessary.

The cap assembly 220 includes a cap plate 240, an insulation plate 250, a terminal plate 260, and an electrode terminal 230. After being coupled to a separate insulation case 270, the cap assembly 220 is coupled to the top opening 210a of the can 210 to seal it.

The cap plate 240 is a metal plate having a size and a shape corresponding to the top opening 210a of the can 210 and may be made from aluminum or an aluminum alloy which is light. The cap plate 240 has a fourth terminal through-hole 241 formed at the center thereof with a predetermined size and an electrolyte injection hole 242 formed on a side thereof. The electrode terminal 230 is inserted into the fourth terminal through-hole 241 and a gasket tube 246 is assembled to the inner surface of the fourth terminal through-hole 241 for insulation between the electrode terminal 230 and the cap plate 240.

The electrolyte injection hole 242 is formed on a side of the cap plate 240 with a predetermined size. After the cap assembly 220 is assembled to the top opening 210a of the can 210, an electrolyte is injected through the electrolyte injection hole 242 which is then sealed by a plug 243.

The insulation plate 250 is made up of an insulation material like the gasket and includes a bottom plate 252 and a lateral wall 253 extending downward from each lateral surface and lateral end of the bottom plate 252. The insulation plate 250 has a fifth terminal through-hole 251 formed in a predetermined position. The insulation plate 250 is coupled to the lower surface of the cap plate 240 and the bottom plate 252 has an area corresponding to that of the terminal plate 260. The height of the lateral wall 253 of the insulation plate 250 may be larger than the thickness of the terminal plate 260.

Figure 4A:
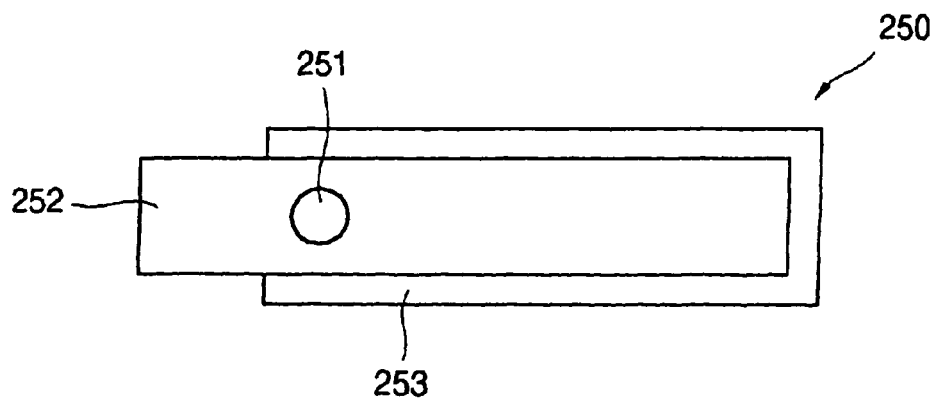
FIG. 4a is a bottom view showing an insulation plate according to an embodiment of the present invention.
Figure 4B:
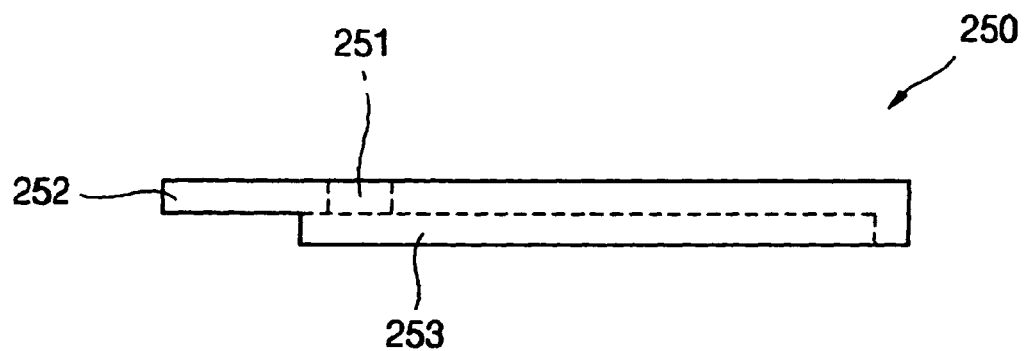

The fifth terminal through-hole 251 may be positioned in such a manner that it corresponds to the fourth terminal through-hole 241 of the cap plate 240 when the insulation plate 250 and the cap plate 240 are coupled to each other. The electrode terminal 230 is inserted into the fifth terminal through-hole 251. The fifth terminal through-hole 251 may be spaced from the center of the insulation plate 250. In the insulation plate 250, referring to FIGS. 4a and 4b, the lateral end wall and the lateral surface wall are partially absent from at least one side about the fifth terminal through-hole 251 when the lateral wall 253 is formed so that only the bottom plate 252 is present. As such, the side of the insulation plate 250 from which the lateral wall 253 is removed has a size corresponding to that of the terminal plate 260 and the lateral end and lateral surface of the insulation plate 250 coincide with those of the terminal plate 260.

Alternatively, the insulation plate 250 may be configured in such a manner that it has no lateral wall 253 formed thereon, the bottom plate 252 being larger than the terminal plate 260, and a side of the insulation plate 250 about the fifth terminal through-hole 251 having a size corresponding to that of the terminal plate 260.

The terminal plate 260 may be made up of Ni metal or an alloy thereof and is coupled to the lower surface of the bottom plate 252 of the insulation plate 250. The terminal plate 260 has a sixth terminal through-hole 261 formed in a position corresponding to the fourth terminal through-hole 241 of the cap plate 240 so that the electrode terminal 230 can be inserted therein.

The electrode terminal 230 is inserted into the fourth terminal through-hole 241 of the cap plate 240, the fifth terminal through-hole 251, and the sixth terminal through-hole 261 while being insulated by the gasket tube 246 and is coupled to the terminal plate 260. As such, the terminal plate 260 is electrically connected to the electrode terminal 230 in the cap assembly 220 while being electrically insulated from the cap plate 240.

The insulation case 270 includes first and second electrode tab holes 272, 271 and is coupled to the bottom of the cap assembly 220 to electrically insulate the cap assembly 220 from the electrode assembly 212. The second electrode tab 216 extends through the second electrode tab hole 271 and is connected to the cap plate 240. The first electrode tab 217 extends through the first electrode tab hole 272 and is connected to the terminal plate 260.

Figure 5A:
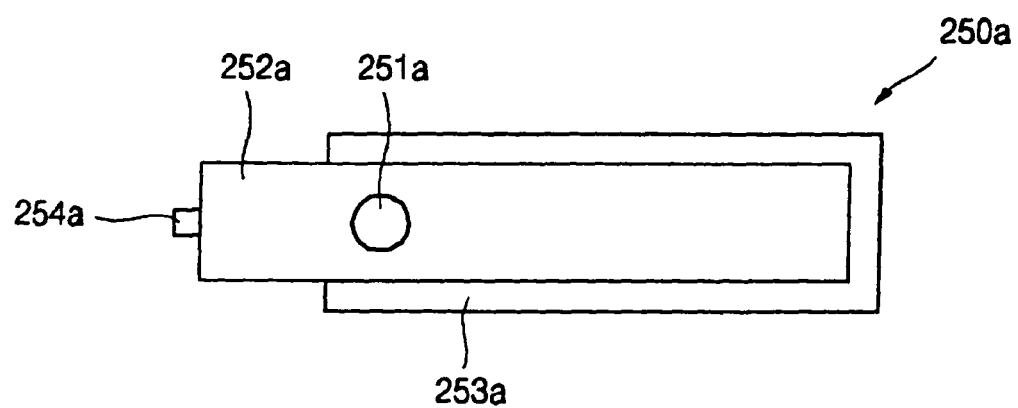
FIG. 5a is a bottom view showing an insulation plate according to another embodiment of the present invention.
Figure 5B:
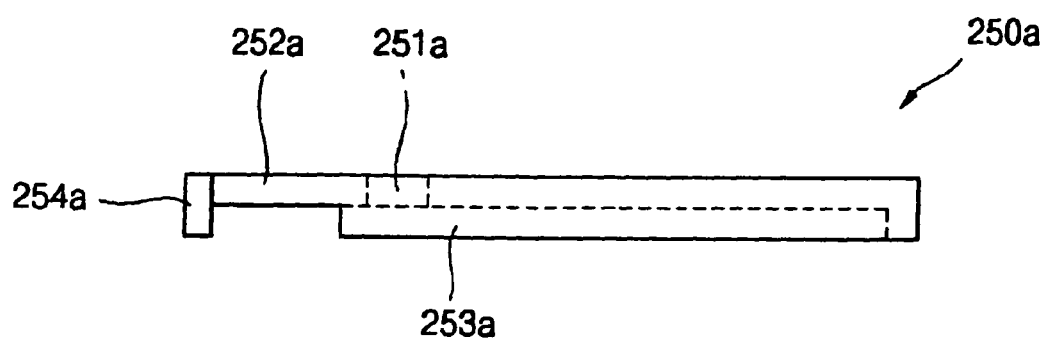

FIG. 5a is a bottom view showing an insulation plate according to another embodiment of the present invention and FIG. 5b is a lateral view of the insulation plate shown in FIG. 5a.

The insulation plate 250a according to another embodiment of the present invention is made from an insulation material such as a gasket and includes a bottom plate 252a and a lateral wall 253a protruding from each lateral surface and lateral end of the bottom plate 252a. The insulation plate 250a has a fifth terminal through-hole 251a formed in a predetermined position.

In the insulation plate 250a, the lateral wall 253a is partially absent from a side about the fifth terminal through-hole 251a. A lateral end wall 254a is formed with a predetermined width on an end of the side from which the lateral wall 253a is absent The width of the lateral end wall 254a may be equal to or less than 50% of the width of the insulation plate 250a. If the width of the lateral end wall 254a is too large, the terminal plate 260 coupled to the bottom surface of the insulation plate may fail to contact the inner wall of the can when rotating. The height of the lateral end wall 254a may be equal to that of the lateral wall 253a, and may also be larger than the thickness of the terminal plate 260.

Accordingly, the lateral end wall 254a of the insulation plate 250a prevents the lateral end of the terminal plate 260 from being short-circuited to the electrode tab. More specifically, the second or first electrode tab 216, 217 protruding from the top of the electrode assembly 212 is a thin metal plate and is welded to the cap plate 240 and the terminal plate 260, respectively, and bent. The second electrode tab 216 and the terminal plate 260 may be short-circuited when the second electrode tab 216 is bent or when the cap assembly 220 is assembled to the can 210. As such, the lateral end wall 254a prevents the second electrode tab 216 and the terminal plate 260 from being short-circuited.

Figure 6:
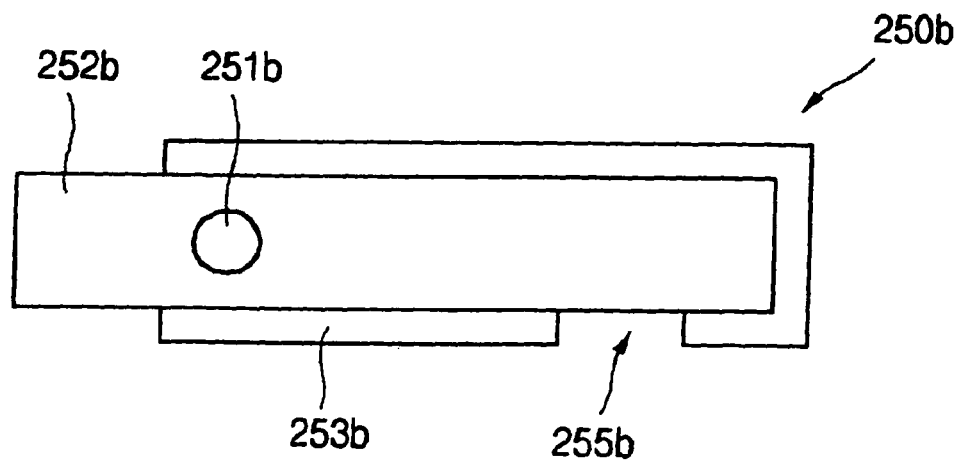
FIG. 6 is a bottom view showing an insulation plate according to another embodiment of the present invention.

FIG. 6 is a bottom view showing an insulation plate according to another exemplary embodiment of the present invention. The insulation plate 250b may be made from an insulation material such as a gasket and includes a bottom plate 252b and a lateral wall 253b extending from each lateral surface and a lateral end of the bottom plate 252b. The insulation plate 250b has a fifth terminal through-hole 251b formed in a predetermined position.

In the insulation plate 250b, the lateral end wall and the lateral surface wall are partially absent from at least one side about the fifth terminal through-hole 251b, when the lateral wall 253b is formed so that only the bottom plate 252b is formed. As such, the side of the insulation plate 250b from which the lateral wall 253b is absent has a size corresponding to the terminal plate 260 and the lateral end and lateral surface of the insulation plate 250b coincide with those of the terminal plate 260.

The lateral wall 253b has a welding groove 255b formed on a lateral surface thereof in a position where the first electrode tab 217 is welded to the terminal plate 260, which is coupled to the other side of the insulation plate 250b about the terminal through-hole 251b. The height of the lateral wall 253b may be larger than that of the terminal plate and, when the first electrode tab 217 is welded to the terminal plate 260, it is difficult to maintain complete contact between the first electrode tab 217 and the bottom surface of the terminal plate 260. Therefore, the welding groove 255b enables the first electrode tab 217 to be fastened to the bottom surface of the terminal plate 260 for easy welding.

The operation of the secondary battery according to an exemplary embodiment of the present invention will now be described.

Figure 7:
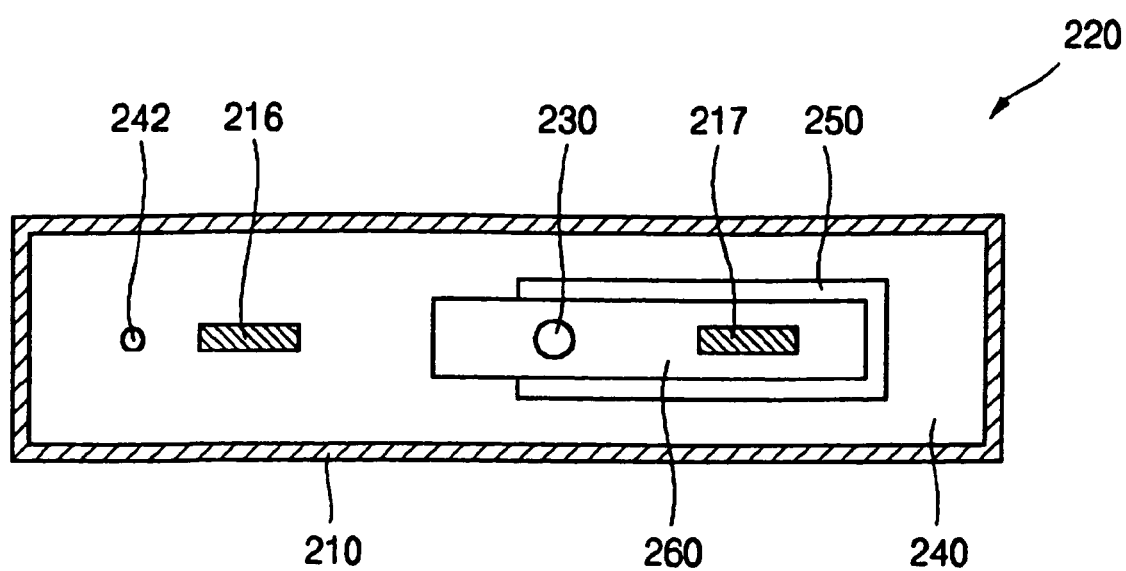
FIG. 7 is a bottom sectional view taken along line A-A' of FIG. 3.

Referring to FIG. 7, the cap assembly 220 has the first and second electrode tabs 217, 216 welded to the bottom surface thereof and is coupled to the top opening 210a of the can 210. The terminal plate 260 is spaced a predetermined distance from the inner wall of the can 210 and is electrically insulated from it. Therefore, the first and second electrode tabs 217, 216 are electrically insulated from each other.

When the can 210 is subjected to deformation, e.g., longitudinal compression, caused by an external impact or pressure applied to the can-type secondary battery, the first and second electrode plates 215 and 213 in the electrode assembly 212 positioned inside the can 210 may be short-circuited while damaging the separator 214. As a result current flows between the first and second electrode plates 215, 213 and heat is generated by the internal resistance of the first and second electrode plates.

Figure 8:
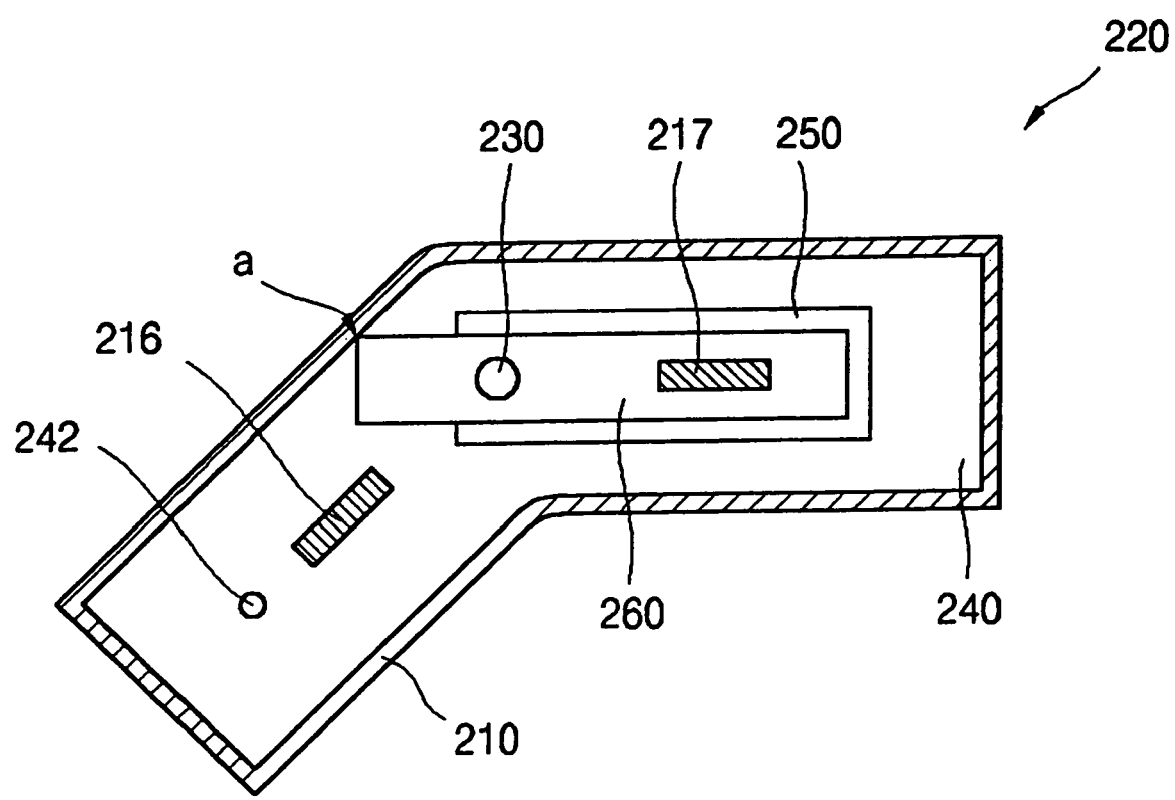
FIG. 8 is a bottom sectional view showing the same part as FIG. 7 subjected to longitudinal compression and deformed.

If the can 210 deforms as shown in FIG. 8, a corner of the terminal plate 260 contacts the inner surface of the can 210 at a point (labeled a) and a short circuit occurs. Since the can 210 is connected to the cap plate 240 and to the second electrode tab 216 and the terminal plate 260 is connected to the first electrode tab 217, the first and second electrodes of the second battery are short-circuited. The can 210 and the terminal plate 260 are made up of metal having low electrical resistance and, if a short circuit occurs between them, current flows abruptly while less heat is generated.

Table 1 below shows the result of measuring resistance and degree of heat generation according to the type of a short circuit between the electrode and the can.

TABLE 1

| Type of short circuit | Electrical resistance (ohm) | Resistance heat (J) | Temperature of short-circuited portion (° C.) |
|---|---|---|---|
| positive electrode plate - negative electrode plate | 11.00 | 3,564 | 150 or higher |
| positive electrode plate - negative electrode tab | 8.70 | 7,830 | 100 or higher |
| can - negative electrode plate | 5.10 | 2,040 | 150 or higher |
| can - negative electrode tab | 0.02 | 24 | 60 |
| positive electrode tab - negative electrode tab | 0.04 | 36 | 65 |

In Table 1, the type of short circuit refers to the pair of components, among the components of the electrode assembly and the can, between which a short circuit is formed; the electrical resistance refers to the electrical resistance measured between the positive and negative electrode tabs after a short circuit is formed according to each type; and the temperature of short-circuited portion refers to the temperature related to the heat generated by the electrical resistance after a short circuit is formed. The method for measuring the resistance between each component and the temperature of short-circuited portion will now be described with reference to an example of a short circuit between the positive and negative electrode plates: positive and negative electrodes are cut with a predetermined size and are positioned to contact each other between two pieces of slide glass; current is applied between both ends and the electrical resistance is measured; the currents are discharged from an actual battery which is safely charged to simulate the maximum discharging current of a cell; and a thermocouple is attached to the exterior of the slide glass to measure the temperature of short-circuited portion.

As shown in Table 1, the electrical resistance and the resistance heat increase and the temperature of short-circuited portion rises when a short circuit is formed between the positive or negative electrode plate and any other component. However, less resistance heat and temperature rise occur when a short circuit is formed between metal, such as between the can and the positive electrode tab or between the positive and negative electrode tabs.

When the secondary battery of the present invention deforms due to longitudinal compression, therefore, a short circuit occurs between each metal of the terminal plate and the can in the cap assembly and the generation of resistance heat and the rise of internal temperature of the battery are minimized.

According to the can-type secondary battery of the present invention, a short circuit is induced between metal within the secondary battery when the secondary battery deforms due to an external impact to reduce heat generation and improve the safety of the secondary battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   an electrode assembly having a first electrode plate, a second electrode plate and a separator;
   a can containing the electrode assembly and an electrolyte; and
   a cap assembly comprising a cap plate, an insulation plate, an electrode terminal, and a terminal plate comprising a mounting surface mounted to the insulation plate and a first side and a second side extending from the mounting surface and being adjacent each other, the cap assembly being coupled to a top opening of the can to seal the top opening,
   wherein the insulation plate has a terminal through-hole for passage of the electrode terminal therethrough, and
   wherein the insulation plate comprises a plate having lateral surfaces and a lateral end, and a lateral wall protruding from each lateral surface and the lateral end of the plate,
   wherein the lateral wall is absent from at least part of the plate to enclose partially one of the first or second sides of the terminal plate, and
   wherein the plate of the insulation plate has an area which is equal to that of the terminal plate and the terminal plate extends beyond an end of the lateral wall, and
   wherein the lateral wall is absent at a portion of the insulation plate where the terminal plate extends beyond the end of the lateral wall.

2. The secondary battery as claimed in claim 1, wherein a width of the lateral end wall is less than or equal to 50% of a width of the insulation plate.

3. The secondary battery as claimed in claim 1, wherein a height of the lateral wall is equal to or larger than a height of the terminal plate.

4. The secondary battery as claimed in claim 1, wherein the insulation plate has a welding groove on the lateral wall at a location where a first electrode tab of the first electrode plate is welded thereto.

5. The secondary battery as claimed in claim 1, wherein the first electrode plate and the second electrode plate are negative and positive electrode plates, respectively.

6. The can-type secondary battery as claimed in claim 1, wherein the lateral wall is absent at another lateral end of the plate opposite the lateral end, and the another lateral end coincides with one of the first side or the second side of the terminal plate.

7. A cap assembly for a secondary battery, the secondary battery including a can containing an electrolyte and an electrode assembly having a first electrode plate, a second electrode plate and a separator, the cap assembly comprising:
   a cap plate;
   an electrode terminal insertable through the cap plate;
   an insulation plate having a terminal through-hole for passage of the electrode terminal therethrough; and
   a terminal plate comprising a mounting surface mounted on a surface of the insulation plate and a first side and a second side extending from the mounting surface and being adjacent each other,
   wherein the insulation plate comprises a plate having lateral surfaces and a lateral end, and a lateral wall protruding from each lateral surface and the lateral end of the plate, wherein the lateral wall is absent from at least part of the plate to enclose partially one of the first or second sides of the terminal plate, and wherein the plate of the insulation plate has an area which is equal to that of the terminal plate and the terminal plate extends beyond an end of the lateral wall, and wherein the lateral wall is absent at a portion of the insulation plate where the terminal plate extends beyond the end of the lateral wall.

8. The cap assembly as claimed in claim 7, wherein a width of the lateral end wall is less than or equal to 50% of a width of the insulation plate.

9. The cap assembly as claimed in claim 7, wherein a height of the lateral wall is equal to or larger than a height of the terminal plate.

10. The cap assembly as claimed in claim 7, wherein the insulation plate has a welding groove on the lateral wall at a location where a first electrode tab of the first electrode plate is weldable thereto.

11. The cap assembly as claimed in claim 7, wherein the first electrode plate and the second electrode plate are negative and positive electrode plates, respectively.

12. The cap assembly as claimed in claim 7, wherein the lateral wall is absent at another lateral end of the plate opposite the lateral end, and the another lateral end coincides with one of the first side or the second side of the terminal plate.

* * * * *